US009042244B2

(12) United States Patent
Senga

(10) Patent No.: US 9,042,244 B2
(45) Date of Patent: May 26, 2015

(54) TCP TRANSMISSION CONTROL DEVICE AND METHOD OF CONTROL OF TCP TRANSMISSION

(75) Inventor: Satoshi Senga, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 252 days.

(21) Appl. No.: 13/139,904

(22) PCT Filed: Dec. 24, 2009

(86) PCT No.: PCT/JP2009/007197
§ 371 (c)(1),
(2), (4) Date: Jun. 15, 2011

(87) PCT Pub. No.: WO2010/073671
PCT Pub. Date: Jul. 1, 2010

(65) Prior Publication Data
US 2012/0063309 A1 Mar. 15, 2012

(30) Foreign Application Priority Data

Dec. 25, 2008 (JP) ................. 2008-331459

(51) Int. Cl.
H04L 29/06 (2006.01)
(52) U.S. Cl.
CPC .............. *H04L 69/16* (2013.01); *H04L 69/163* (2013.01)
(58) Field of Classification Search
USPC ........................................................ 370/252
See application file for complete search history.

(56) References Cited

U.S. PATENT DOCUMENTS

| 7,634,574 | B2 | 12/2009 | Senga et al. | |
| 2003/0105977 | A1* | 6/2003 | Brabson et al. | 713/201 |
| 2005/0226149 | A1* | 10/2005 | Jacobson et al. | 370/229 |
| 2006/0034176 | A1* | 2/2006 | Lindsay | 370/236 |
| 2006/0227804 | A1 | 10/2006 | Gonzalez et al. | |
| 2007/0297334 | A1* | 12/2007 | Pong | 370/235 |
| 2008/0002575 | A1* | 1/2008 | Kumar et al. | 370/229 |
| 2008/0031267 | A1 | 2/2008 | Imao | |
| 2008/0295098 | A1* | 11/2008 | Cardona et al. | 718/101 |

FOREIGN PATENT DOCUMENTS

| CN | 1845510 | 10/2006 |
| CN | 101119388 | 2/2008 |
| EP | 1 124 362 | 8/2001 |
| EP | 1885098 | 6/2008 |
| JP | 2001-268159 | 9/2001 |
| JP | 2002-84289 | 3/2002 |

(Continued)

*Primary Examiner* — Jason Mattis
*Assistant Examiner* — Adnan Baig
(74) *Attorney, Agent, or Firm* — Greenblum & Bernstein, P.L.C.

(57) ABSTRACT

A TCP transmission control device and a method of controlling a TCP transmission are provided that achieve greater efficiency of TCP transmission processes for applications that use intermittent transmission methods. A communication terminal includes a TSO control unit, which determines whether a TCP session open for data transmission is using a TCP segment link transmission process. The communication terminal also includes a link management unit, which manages all information consisting of the session identifiers employed in TCP sessions, and link transmission processing usage information and maximum number of TCP segment links notified from the TSO control unit, on a per TCP session basis.

6 Claims, 12 Drawing Sheets

(56) References Cited

FOREIGN PATENT DOCUMENTS

| JP | 2003-102057 | 4/2003 |
| JP | 2003-224619 | 8/2003 |
| JP | 2006-100919 | 4/2006 |
| JP | 2006-294027 | 10/2006 |
| JP | 2007-142582 | 6/2007 |
| JP | 2008-61223 | 3/2008 |

* cited by examiner

| MANAGEMENT NUMBER | SESSION DESCRIPTOR | TSO OPERATION | MAXIMUM NUMBER OF CONNECTIONS |
|---|---|---|---|
| ① | A | ON | 8 |
| ② | B | OFF | 0 |
| ③ | C | OFF | 0 |

FIG.3

| SESSION DESCRIPTOR | TCP WINDOW | TSO OPERATION | NUMBER OF RETRANSMISSIONS | ... |
|---|---|---|---|---|
| A | 64 | OFF | 3 | ... |
| B | 32 | OFF | 3 | ... |
| C | 64 | OFF | 3 | ... |

FIG.5

TCP TRANSMISSION CONTROL DEVICE AND METHOD OF CONTROL OF TCP TRANSMISSION

TECHNICAL FIELD

The present invention relates to a TCP (transmission control protocol) transmission control apparatus and TCP transmission control method. More particularly, the present invention relates to an improvement on an efficient transmission control method upon transmitting data via the transport control protocol/Internet protocol (TCP/IP).

BACKGROUND ART

When distributing data via TCP on the Internet, it is necessary to consider changes and variations in network conditions due to various factors including delay, jitter, and packet loss. Further, as for a receiving terminal, it is necessary to assume wide-ranging support for terminals having high capability and low capability. Conventional, general TCP stacks have made possible best-effort data distribution using transmission control parameters by presuming a personal computer (PC) as a communication terminal.

With the above-described TCP/IP communication realized by software, because protocol processing is performed as software processing under the control of OS, a terminal's overall CPU processing load increases and protocol processing is hindered when other prioritized processing are performed, sometimes making it difficult to ensure real-time processing in data transmission of an application being connected. To avoid this kind of phenomenon, as shown in FIG. 1, in recent years, a terminal that realizes protocol processing in the TCP/IP communication using hardware (also referred to as network processing unit, NPU) appeared.

FIG. 1 shows a configuration of communication terminals using the conventional TCP/IP.

As shown in FIG. 1, a communication terminal using TCP/IP is configured with, for example, low-end/middle-end machine 10 such as a personal computer (PC) and a personal digital assistant (PDA), and high-end machine 20 such as a commercial system server.

With low-end/middle-end machine 10, a kernel under the control of OS performs each protocol process sequentially when a user commands an execution of an application. In FIG. 1, a kernel processes all functions of the TCP layer and processes all functions of the IP layer, in transmission processing according to application commands. Then, a network device driver and a network device perform transmission according to the protocol processing in TCP/IP communication. Reception processes follows a reverse order to the transmission processes.

On the other hand, with high-end machine 20, when a user commands execution of an application, a kernel under the control of OS performs each protocol processing sequentially. However, processing of all functions of the TCP layer and processing of all functions of the IP layer are performed in a network processor (NPU) in hardware (HW).

As described above, communication using a TCP/IP is realized by software and introduced in various systems. With high-end machine 20, introduction of a NPU, with which a TCP/IP is processed by hardware, is realized. Because processing to be performed by OS is performed by hardware, it is possible to improve the throughput and reduce the CPU load.

Patent Literature 1 discloses an apparatus for processing TCP/IP by hardware. The apparatus disclosed in Patent Literature 1 provides a protocol stack by hardware that can perform protocol processing for data transmission of an application being connected, apart from the control of OS.

Patent Literature 2 discloses a method for processing data for the TCP connection using an off-load unit. The method disclosed in Patent Literature 2 is provided with software function that issues to hardware a request for transmitting application data by connecting a plurality of segments in a batch, not for transmitting data per TCP segment, as is in a conventional method, and hardware that re-divides the connected segments received in a batch into TCP transmission segments and transmits the segments sequentially to a network. By this means, Patent Literature 2 tries to improve the efficiency of protocol processing in TCP/IP communication.

The maximum number of TCP segments that can be connected at a time is decided by referring to a congestion window size at the time and setting the window size as the upper limit value. A congestion window size is an inner variable retained by the TCP layer, and indicates a segment size that can be transmitted. The size varies constantly depending on changes in network conditions. The above-described method for transmitting connected TCP segments in a batch is referred to as "TCP segmentation offload (TSO)." TSO is a function of performing part or all of TCP segmentation processing by hardware (NIC). Because processing to be performed by OS is partly performed by hardware, improved throughput or reduced CPU load can be expected.

As described above, TCP segment processing may not be performed per TCP segment by software, but a plurality of TCP segments can be processed in a batch as an amount of workload for a time. Because software processes a plurality of TCP segments in a batch, it is possible to reduce the amount of workload (CPU processing load) for software under the control of OS, in transmission.

CITATION LIST

Patent Literature

PTL1
Japanese Patent Application Laid-Open No. 2003-102057
PTL2
Japanese Patent Application Laid-Open No. 2003-224619

SUMMARY OF INVENTION

Technical Problem

However, with a conventional TCP/IP communication apparatus of this kind, because division of functions for software processing and hardware processing in the TCP/IP communication protocol processing mainly targets a general use (general PCs, for example, are presumed), there is a problem that it is difficult to achieve full transmission performance of TCP/IP communication, for example, for incorporated devices to use for specific purpose or applications having a constant regularity for a method for communicating transmission data.

It is therefore an object of the present invention to provide a TCP transmission control apparatus and a TCP transmission control method for an application using an intermittent transmission method, so as to realize efficient TCP transmission processing.

Solution to Problem

A transport control protocol transmission control apparatus for performing transport control protocol/Internet protocol data transmission of by hardware processing and software processing according to the present invention, the apparatus comprising: a transport control protocol segmentation offload control section that determines whether or not to use transmission control protocol segment connected transmission processing in a transport control protocol session that is open for data transmission; a connection management section that manages a session identifier to be used in the transport control protocol session, information about use of connected transmission processing and a maximum number of connections of transport control protocol segments that are reported from the transport control protocol segmentation offload control section, and sets a transport control protocol segmentation offload operation on and off, per transport control protocol session, separately, and enables and stops a transport control protocol segmentation offload function.

A transmission control protocol transmission control method for performing data transmission of transport control protocol by hardware processing and software processing according to the present invention, the method comprising the steps of: determining whether or not to use transport control protocol segment connected transmission processing in a transport control protocol session that is open for data transmission; and managing a session identifier to be used in the transport control protocol session, and information about use of connected transmission processing and a maximum number of connections of the transport control protocol segments that are reported from a transport control protocol segmentation offload control section, and setting a transport control protocol segmentation offload operation on/off separately and enabling/stopping a transport control protocol segmentation offload function per transport control protocol session.

Advantageous Effects of Invention

According to the present invention, by managing a session identifier to be used in a TCP session, information about use of TCP segment connected transmission processing, and the maximum number of connections of TCP segments, per TCP session, it is possible to realize efficient data transmission in TCP/IP communication by using software processing and hardware processing efficiently. Specifically, the present invention has the following effects:

(1) It is possible to decide whether or not to use a TCP-segment connected transmission function per application (session), making it possible to perform efficient TCP communication depending on device characteristics.

(2) When congestion is detected in a network due to packet loss, after repair processing of the packet loss in the session is finished, it is possible to enable the connected transmission function for a plurality of segments, making it possible to suppress an increase in the CPU load for processing packet loss due to changes in network conditions, and perform efficient TCP transmission.

(3) In the case of an application using an intermittent transmission method, it is possible to suppress reduction of a congestion window size and prevent a decrease in the number of connected transmissions of a plurality of segments, making it possible to maintain the transmission performance and perform efficient TCP communication.

For example, even in the case of transmission processing after packet loss occurs, or an application using an intermittent transmission method, by suppressing processing by software under the control of OS, it is possible to perform efficient TCP communication with the reduced CPU load.

BRIEF DESCRIPTION OF DRAWINGS

FIG. 3 shows an example of a configuration of TCP transmission control information managed by a connection management section in the TCP transmission control apparatus according to above Embodiment 1;

FIG. 5 shows an example of TCP communication management information in the TCP transmission control apparatus according to above Embodiment 1;

DESCRIPTION OF EMBODIMENTS

Now, embodiments of the present invention will be described in detail with reference to the accompanying drawings.

(Embodiment 1)

Figure 1:
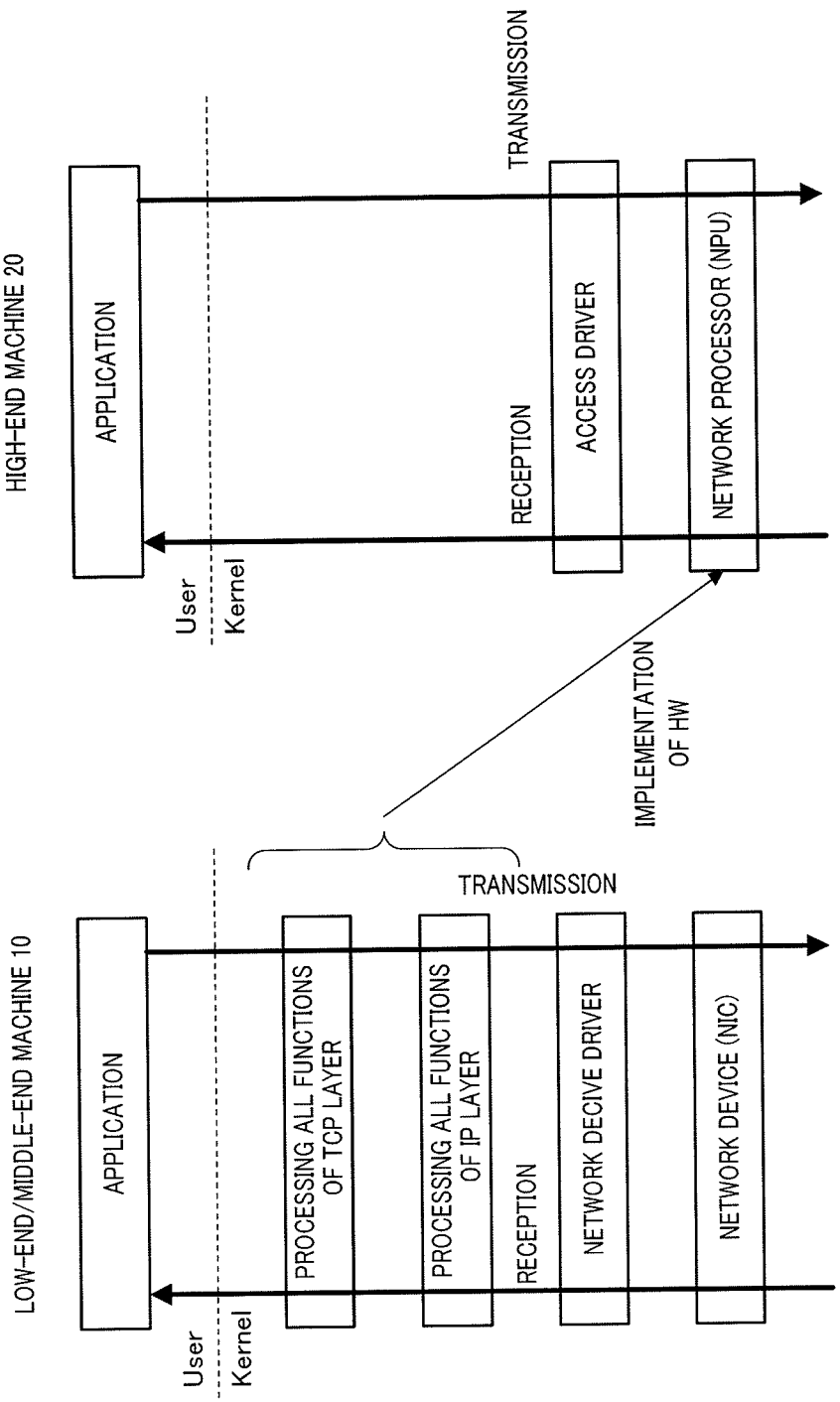
FIG. 1 shows a configuration of communication terminals using a conventional TCP/IP.
Figure 2:
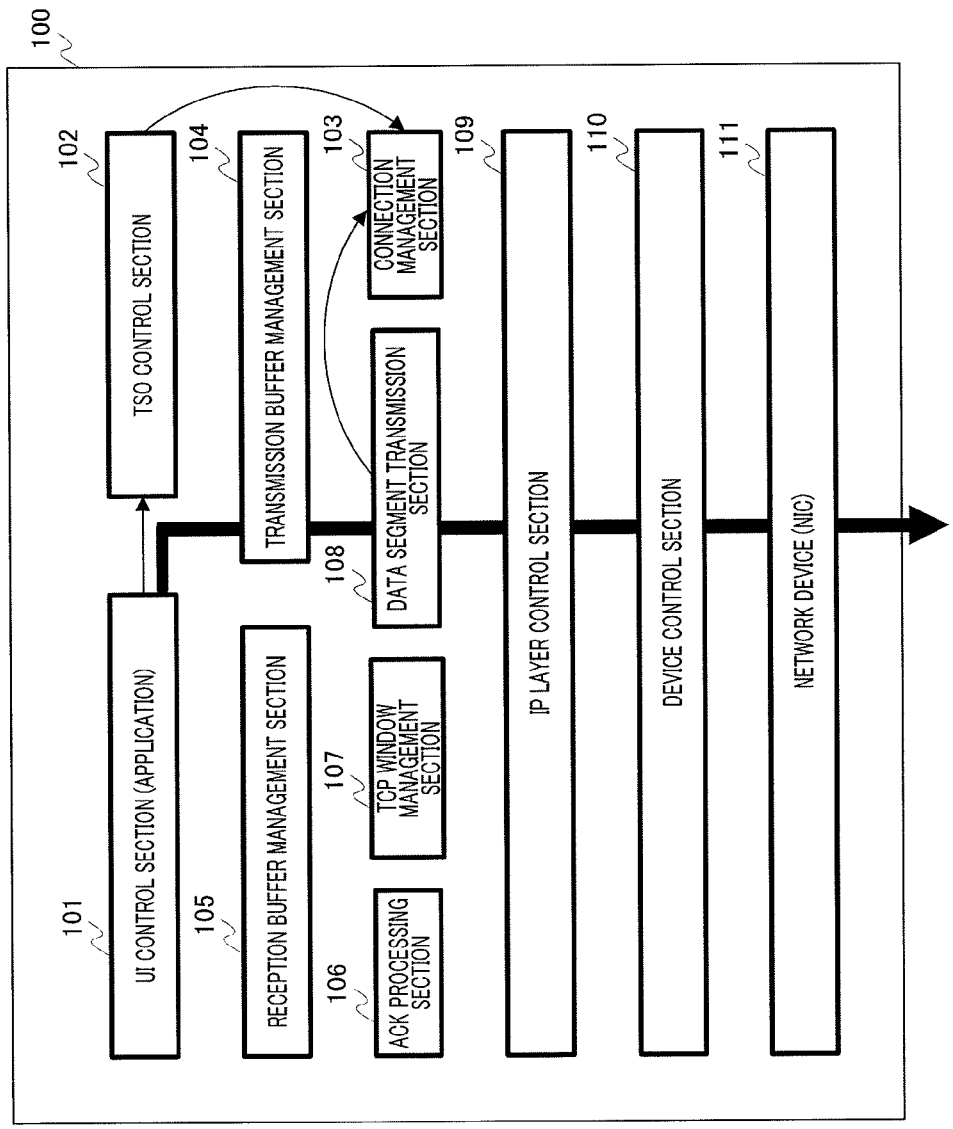
FIG. 2 shows a configuration of a communication terminal in which a TCP transmission control apparatus according to Embodiment 1 of the present invention is used.

FIG. 2 shows a configuration of a communication terminal in which the TCP transmission control apparatus according to Embodiment 1 of the present invention is used; The TCP transmission control apparatus according to the present embodiment is applicable to a transmission terminal of a home network.

As shown in FIG. 2, communication terminal 100 is a transmission apparatus in which the TCP/IP communication are separately processed by hardware and software.

Communication terminal 100 is configured with user interface (UI) control section 101 that controls input and output of information to and from a user, TSO control section 102 that decides whether or not to use a TCP-segment connected transmission function, connection management section 103 that manages control information about the connected transmission function from TSO control section 102, per application (session), transmission buffer management section 104 that performs TCP/IP transmission buffer control, reception buffer management section 105 that performs reception buffer control, ACK processing section 106 that performs acknowledgement processing for data transmission in TCP/IP communication, TCP window management section 107 that manages TCP segments that can be transmitted upon receiving acknowledgement, data segment transmission section 108 that transfers TCP segments to transmit to the IP layer, IP layer control section 109 that performs IP layer processing of a packet, device control section 110 that controls network devices, and network device 111 that communicates with outer networks.

UI control section 101 is provided with a function of receiving a user's command about whether or not TSO can be used, and a function of transmitting media data including sounds and movies, and a function of passing a transmission start request to TSO control section 102 upon receiving a transmission request.

TSO control section 102 determines whether or not to use TCP segment connected transmission processing in a TCP session that is open for data transmission.

Specifically, upon receiving a transmission start request from UI control section 101, TSO control section 102 manages the transmission start request as TSO setting information (on/off and the maximum number of connections for TSO), and passes the information to connection management section 103. Here, TSO setting information is not limited to a setting designated by a user, and may be decided by the status such as the number of current sessions within communication terminal 100.

[An Example where TSO Setting Information is Set Off]

TSO setting information (on/off) is decided depending on the system configuration of communication terminal 100 or the communication status at that time, for example, when other communication application is executed within the terminal, TSO setting information is set off, taking into account the CPU load or contention between applications.

Connection management section 103 manages all of the information about a session identifier to be used in the TCP session, and information about use of connected transmission processing and the maximum number of connections of TCP segments that are reported from TSO control section 102, per TCP session.

Connection management section 103 enables/disables the TSO function by separately setting a TSO operation on/off, for each session identifier.

Connection management section 103 is provided with a function of managing the TSO setting information received from TSO control section 102 as TCP transmission control information 200, per application (session), and deciding whether or not to set a TSO operation on/off depending on changes in a congestion window size in TCP window management section 107.

Transmission buffer management section 104 is a buffer for temporarily accumulating actual transmission data passed from UI control section 101. The transmission data stored in transmission buffer management section 104 is obtained sequentially by data segment transmission section 108.

Reception buffer management section 105 is a buffer for temporarily accumulating the data transmitted from a receiving terminal, via IP layer control section 109. The data stored in reception buffer management section 105 is obtained sequentially by UI control section 101.

Generally, ACK processing section 106 and TCP window management section 107 are provided with a function of taking measures against changes in network conditions or packet loss, by containing algorithms such as slow start, congestion avoidance, early retransmission, and early recovery as TCP control functions. Further, TCP window management section 107 manages a congestion window size, and reduces the managing congestion window size when ACK processing section 106 detects packet loss. This algorithm for reduction is controlled based on the TCP mechanism.

Data segment transmission section 108 is provided with a function of transferring a TCP-segment transmission method to the IP layer according to the basic operation of TCP communication, by referring to TCP communication management information 310 (see FIG. 5 below).

IP layer control section 109, which is an IP protocol stack, controls the transmission data passed from data segment transmission section 108 according to the IP mechanism, and distributes the transmission data to the receiving terminal via device control section 110 and network device 111.

Device control section 110 controls a network device.

Network device 111 is provided with a function of transmitting the data received from device control section 110 to actual network, and a function of passing the data received from the network to device control section 110. Further, network device 111 is also provided with a function of transmitting the data to the network by dividing the received connected data into a unit of TCP segment, when TSO is enabled upon transmission.

FIG. 3 shows an example of a configuration of TCP transmission control information 200 managed by connection management section 103.

TCP transmission control information 200 is a database that connection management section 103 changes based on a TCP communication status. TCP transmission control information 200 is created based on TSO setting information managed by connection management section 103, and is stored as a database.

As shown in FIG. 3, TCP transmission control information 200 stores session descriptor 202, TSO operation 203, and maximum number of connections 204, per management number 201.

TCP transmission control information 200 manages the number of sessions opened by communication terminal 100 based on management number 201, and links session descriptor 202 to UI control section 101 (application). TSO operation 203 manages a TSO use status in a given session on on/off basis. Maximum number of connections 204 is provided to manage the maximum number of TCP segments to connect at a time, and is set based on the user's designation via TSO control section 102. When there is no designation from a user, maximum number of connections 204 is set based on a congestion window size in TCP window management section 107, which varies depending on conditions of the communicating network. Above-described setting information is controlled on the transmitting side of a TCP/IP application.

Further, TCP transmission control information 200 can be changed via TSO control section 102, based on the user's designation.

Figure 4:
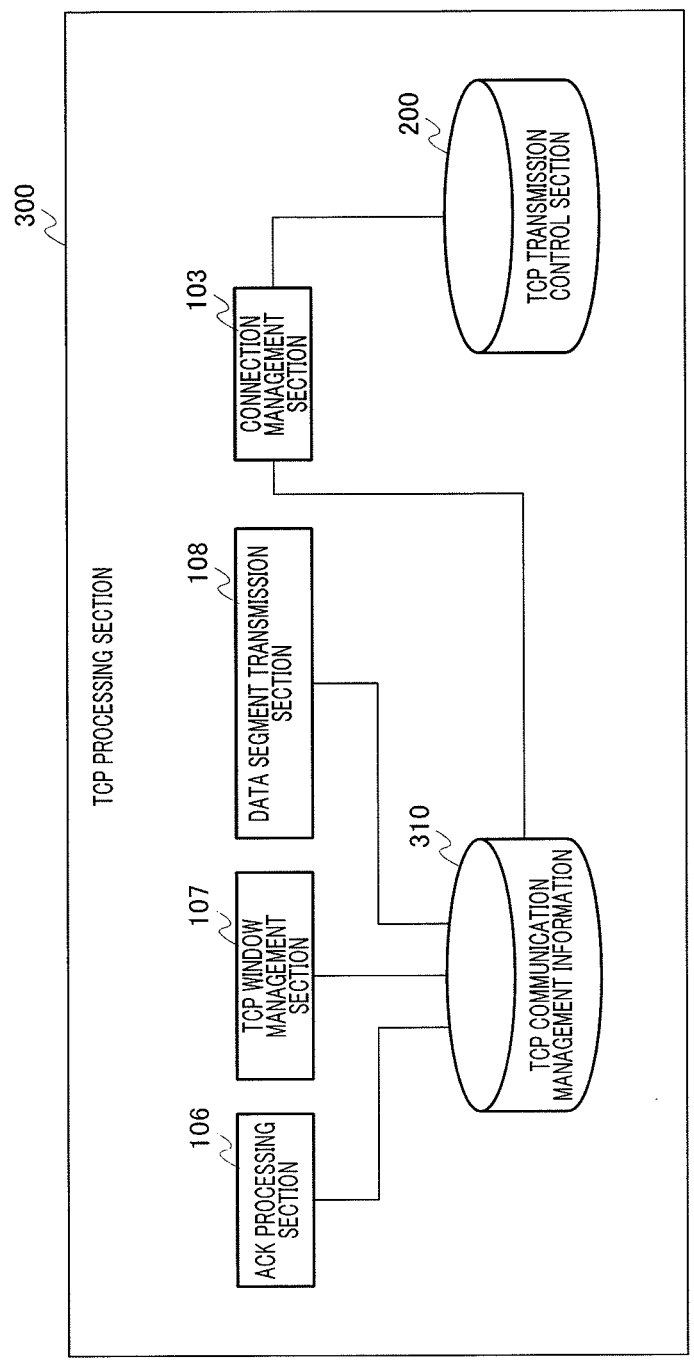
FIG. 4 shows a configuration of a processing section in the TCP transmission control apparatus according to above Embodiment 1.

FIG. 4 shows a configuration of TCP processing section 300.

As shown in FIG. 4, TCP processing section 300 controls the whole TCP communication. TCP processing section 300 is configured with ACK processing section 106, TCP window management section 107, data segment transmission section 108, and connection management section 103 in FIG. 2, and TCP communication management information 310, which is a common database.

TCP processing section 300 controls TCP communication by referring to/updating TCP communication management information 310, a common database.

FIG. 5 shows an example of TCP communication management information 310.

As shown in FIG. 5, TCP communication management information 310 manages parameters for controlling the whole TCP communication, such as a value of a TCP window (a congestion window size), TSO operation setting which conventionally has allowed only two options of where either on or off is set for all sessions, and other terminal-specific setting values (for example, the value of the number of retransmissions when packet loss occurs.) Parameters managed by TCP communication control information 310 include various values depending on a terminal. With the present embodiment, three parameters of a session descriptor, a TCP window, and a TSO operation are used.

Now, operation of communication terminal 100 configured as the above-described transmission apparatus will be described below.

An operation will be described using the control sequence in FIG. 6, where communication terminal 100 starts an application and updates TCP transmission control information 200, and then starts transmitting actual media data, for example.

Figure 6:
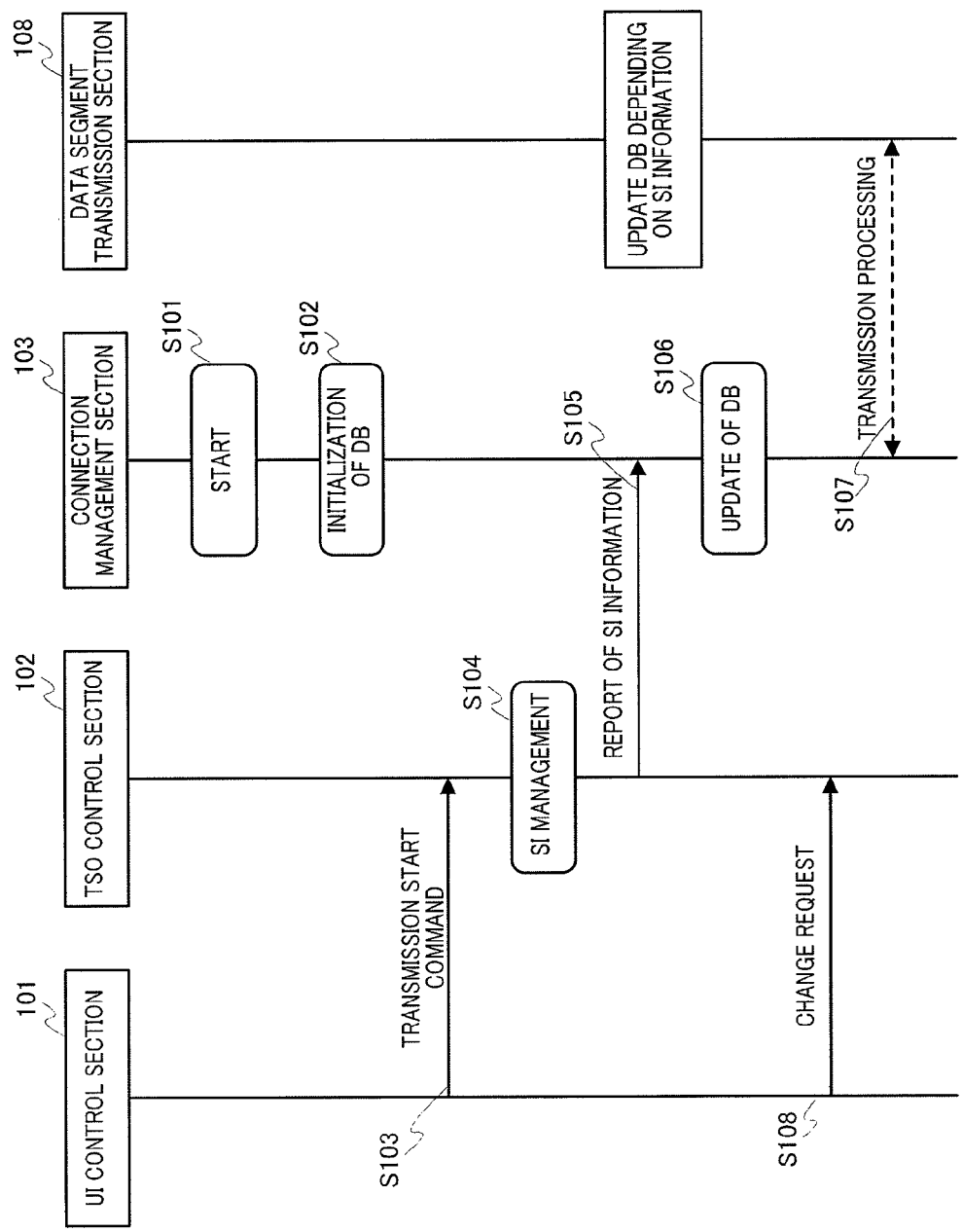
FIG. 6 shows a control sequence including start of an application, update of TCP transmission control information 200, and start of transmission of media data, for example, in the TCP transmission control apparatus according to above Embodiment 1.

FIG. 6 shows a control sequence including start of an application, update of TCP transmission control information 200, and start of transmission of media data, for example.

Communication terminal 100 first initializes the whole system when turning on the power. This initialization includes initialization of resident applications and initialization of network device 111 (see S101).

Connection management section 103 initializes each parameter of TCP transmission control information 200 at the timing of turning on the power, and prepares to receive TSO setting information reported at the timing of starting a communication application and of starting transmission (see S102).

After communication application is started, when receiving a communication command from a user, TSO control section 101 issues a transmission start message to TSO control section 102 (see S103).

When receiving this message, TSO control section 102 manages the received message as TSO setting information (on/off, and, if necessary, the maximum number of connections of TSO) (see S104), and reports the information to connection management section 103 (see S105).

When receiving this report, connection management section 103 grants new management number 201 (see FIG. 3) as TCP transmission control information 200 (see FIG. 3), manages a socket ID of the reported session based on session descriptor 202 (see FIG. 3), and manages the content of TSO setting information by storing the content in the database of TCP transmission control information 200 (see S106).

When TCP transmission control information 200 is changed, connection management section 103 updates all the applicable parameters in TCP transmission management information 310 (see FIG. 5) in TCP processing section 300 (see FIG. 4) at the same time. Because updates are performed per session descriptor, it is possible to set on or off separately in each TSO operation.

Further, when maximum number of connections 204 (see FIG. 3) in TCP transmission control information 200 (see FIG. 3) is changed, a TCP window value in TCP communication management information 310 (see FIG. 5) is updated. As described above, suppressing a value of a TCP window (a congestion window size) leads to suppressing the maximum number of connections at the time of TCP transmission, making it possible to control the transfer rate.

When data transmission is started, data segment transmission section 108 performs TCP-segment connected transmission by referring to TCP communication management information for each transmission timing at a process of TCP transmission processing (see S107).

When the use status of a TSO function or the number of connections of TCP segments are desired to be changed during data transmission, it is possible to change the setting anytime via TSO control section 102 (S108). Accordingly, it is possible to decide whether or not to use a TCP-segment connected transmission function per application (session).

As described in detail above, communication terminal 100 according to the present embodiment is provided with TSO control section 102 that determines whether or not a TCP session that is open for data transmission uses TCP-segment connected transmission processing, and connection management section 103 that manages all of the information about session identifier 202 to be used in a TCP session, and information about use of connected transmission processing and the maximum number of connections of TCP segments that are reported from TSO control section 102, per TCP session. By this means, with communication terminal 100, it is possible to decide whether or not to use a TCP-segment connected transmission function per application (session), making it possible to perform efficient TCP communication depending on device characteristics.

With a conventional connected transmission method for a plurality of TCP segments, when starting a terminal, whether or not to use a TCP-segment connected transmission function is decided for the system as a whole. By contrast, with the present embodiment, it is possible to decide whether or not to use a TCP-segment connected transmission function per application (session), making it possible to perform efficient TCP communication depending on device characteristics. For example, when a receiving terminal having low capability is a communicating party, it is possible to separately stop a connected transmission method for a plurality of segments, reducing factors to cause a receiving terminal to miss receiving data, and suppressing an increase in overhead due to retransmission control in TCP, which is caused by packet loss.

The above effects will be described more specifically comparing to a conventional example.

(1) With a conventional connected transmission method for a plurality of segments, because, when starting a terminal, whether or not to use a TCP-segment connected transmission function is decided for the system as a whole, it is difficult to perform data transmission control separately per application (session). When a receiving terminal having low capability is a communicating party, this kind of connected transmission method for a plurality of segments (a method of transmitting data sequentially) forms factors to cause a receiving terminal to miss receiving data, and retransmission control occurs in TCP due to packet loss, increasing overhead. That is, with the conventional example, because, when starting a terminal, whether or not to use a data segment connected transmission is decided for the system as a whole, it is difficult to perform control separately per application (session).

By contrast, with the present embodiment, it is possible to perform control per session (application), making it possible to perform efficient TCP communication depending on device characteristics.

(2) With the conventional transmission control, because TCP functions are divided into software and hardware mainly targeting a general-purpose use, when network congestion due to packet loss is detected, a function of disabling the connected transmission function for a plurality of segments is operated until the session is finished. By this means, because the connected transmission function for a plurality of segments is not operated after packet loss occurs, software will perform the protocol processing per TCP segment under the control of OS, causing the increased CPU processing load and the reduced transmission performance. That is, with the conventional example, when congestion is detected, the data segment connected transmission function is disabled until a session is finished, reducing the communication performance. The performance will deteriorate even when TSO is always enabled.

By contrast, with the present embodiment, when network congestion due to packet loss is detected, after a repair process of the packet loss in the session is finished, it is possible to enable the connected transmission function for a plurality of segments, making it possible to suppress an increase in the CPU load for processing packet loss due to changes in network conditions, and perform efficient TCP communication.

(3) In the case of an application using an intermittent transmission method, there is a problem that, when an intermittent period is longer than a retransmission timeout period (RTO) of a terminal, a function of TCP/IP communication, where the retained congestion window size value is reduced to a half, is enabled, so that, accompanying the reduction of a congestion window size, the number of connected transmissions of a plurality of segments decreases, causing the reduced transmission performance. That is, with the conventional example, in the case of an application using an intermittent transmission method, a congestion window size is reduced for each intermittent period, making it difficult to effectively use the data segment connected transmission function.

By contrast, with the present embodiment, in the case of an application using an intermittent transmission method, it is possible to suppress reduction of a congestion window size, making it possible to maintain the transmission performance, and perform efficient TCP communication by preventing the number of connected transmissions of a plurality of segments from decreasing.

(Embodiment 2)

Next, a flow of processes at communication terminal 100 when network congestion is detected due to lost packets, will be described with Embodiment 2.

Figure 7:
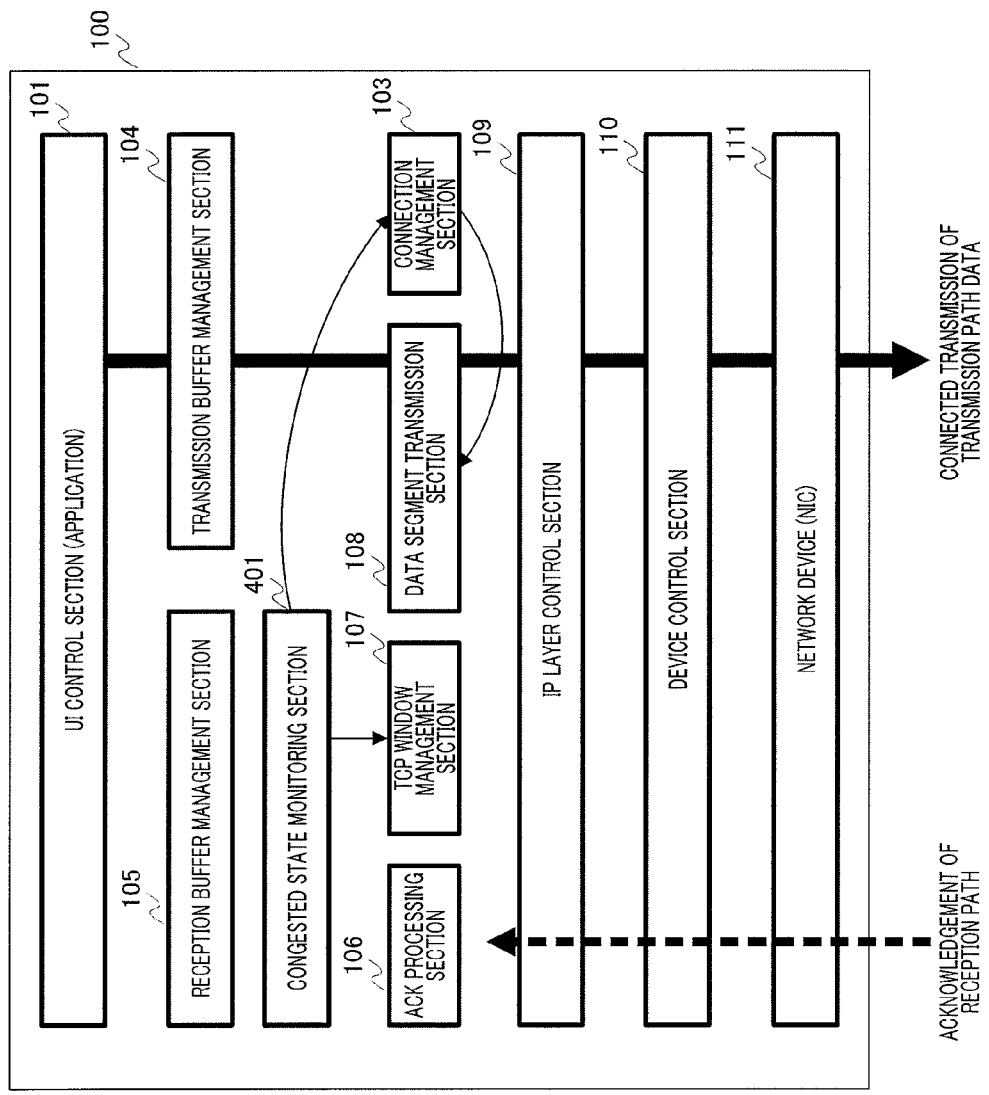
FIG. 7 shows a configuration of a communication terminal using the TCP transmission control apparatus according to Embodiment 2.

FIG. 7 is a block diagram showing a configuration of a communication terminal using the TCP transmission control apparatus according to Embodiment 2 of the present invention. Elements that are the same as in FIG. 2 will be assigned the same reference numerals as in FIG. 2.

As shown in FIG. 7, congested state monitoring section 401 monitors changes in network conditions, for example, lost packets due to network congestion. Congested state monitoring section 401 monitors a congestion window size managed by TCP window management section 107, determines that the network is in a congested state when the size is reduced from the size in the regular state to nearly a half, and reports a request for stopping the TSO function (or for resuming when the reduced size is recovered to the size in a regular state) to connection management section 103. Other block functions are the same as in FIG. 2.

Further, connection management section 103 sets a TCP window value to reduce a congestion window size value based on the managing maximum number of connections.

Next, an operation of communication terminal 100 will be described using the sequence in FIG. 8, where communication terminal 100, in a state in which its TSO function is enabled, detects network congestion due to lost packets and stops its TSO function, and later, after having undergone a TCP congestion recovery phase and resumed its normal state, enables the TSO function.

Figure 8:
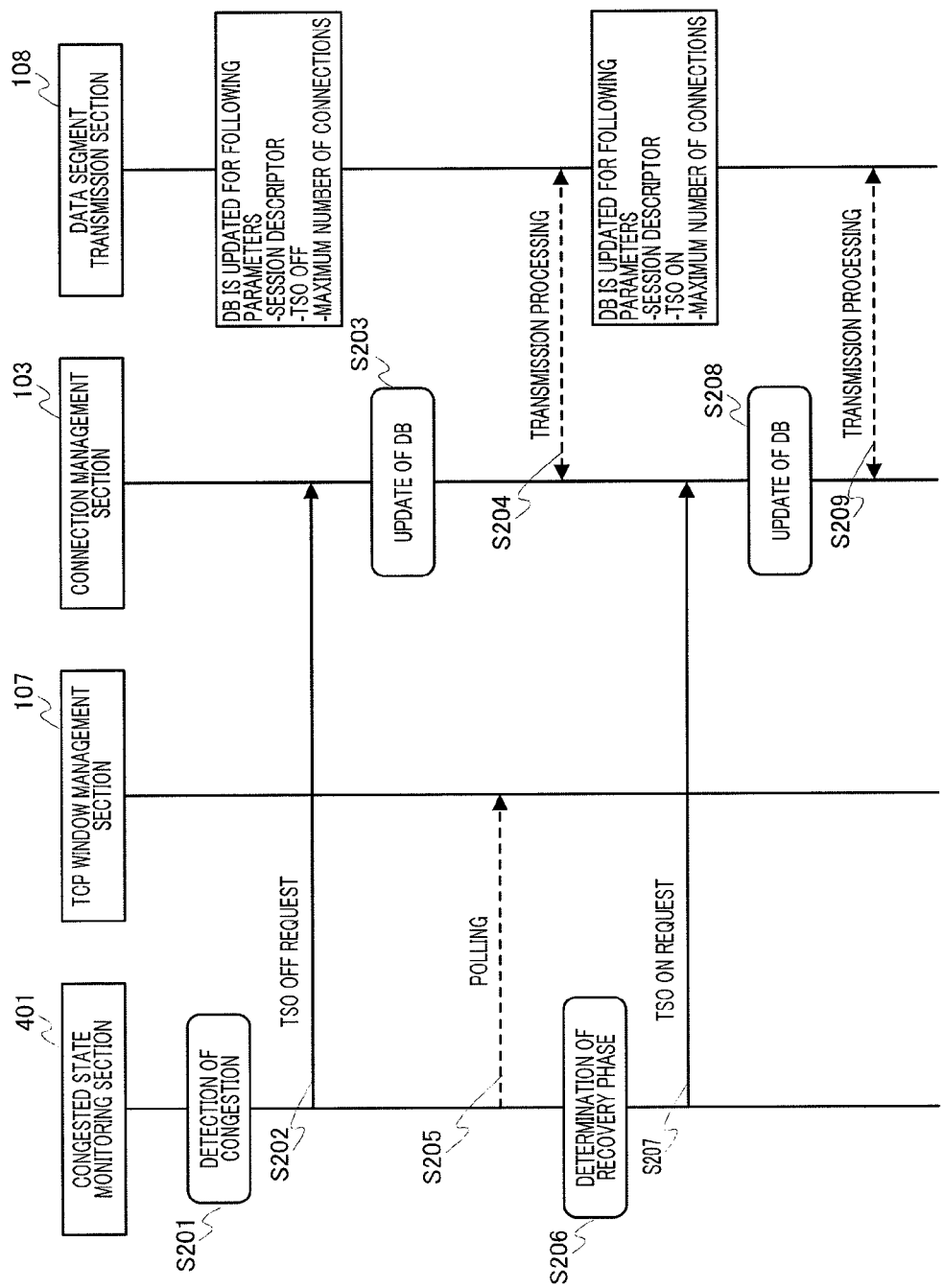
FIG. 8 shows a control sequence of network congestion detection, disabling TSO function, a TCP congestion recovery phase, and TSO function recovery in the TCP transmission control apparatus according to above Embodiment 2.

FIG. 8 shows a control sequence of network congestion detection, stopping TSO function, a TCP congestion recovery phase, and TSO function recovery.

As shown in FIG. 8, when data communication by an application is started, a congestion window size managed by TCP window management section 107 increases to be a certain value and be in a regular state via the TCP slow start phase.

Congested state monitoring section 401 always monitors changes in a congestion window size during the time from start to end of an application. Afterwards, when the network condition changes and ACK processing section 106 determines lost packets, TCP window management section 107 reduce a congestion window size.

When detecting reduction of a congestion window size (see S201), congested state monitoring section 401 issues a request for disenabling (off) the TSO function, to connection management section 103 (see S202).

Connection management section 103 stops the TSO function by changing TSO operation 203 in applicable management number 201 in stored TCP transmission control information 200, to off (see S203).

Data segment transmission section 108 checks the presence or absence of the TSO function for each event of TCP segment transmission, based on TCP communication management information 310 (see FIG. 5). Therefore, data segment transmission section 108 stops transmission of TCP segments in a batch at the point when the TSO function is disabled, and continues data transmission by changing the transmission method into the usual method of data transmission per segment (see S204).

In TCP communication, after lost packets, a congestion window size is gradually increased via the slow start phase and the congestion recovery phase of TCP.

Congested state monitoring section 401 always monitors a congestion window size regardless of whether or not packets are lost (see S205). For this reason, congested state monitoring section 401 determines the congestion recovery phase (see S206), and, when the congestion window size is returned to a normal state after the congestion recovery phase, issues a request for enabling the TSO function (on) to connection management section 103 (see S207).

Connection management section 103 enables the TSO function by changing TSO operation 203 for applicable management number 201 in stored TCP transmission control information 200, to on (see S208).

Data segment transmission section 108 checks the presence or absence of the TSO function for each event of TCP segment transmission, based on the TCP communication management information. With this reason, data segment transmission section 108 recovers transmission of TCP segments in a batch at the point when the TSO function is enabled, and continues data transmission by changing the transmission method from the usual method of transmitting data per segment into the transmission in a batch (see S209).

By using the above-described control sequence, it is possible to resume the connected transmission function for a plurality of segments, even after packet loss occurs.

As described above, according to Embodiment 2, communication terminal 100 is provided with connection management section 103 that manages session identifier 202 to be used in a TCP session, information about use of TCP segment connected transmission processing, and the maximum number of connections of TCP segments, per TCP session. Further, communication terminal 100 is provided with congested state monitoring section 401 that monitors packet loss of transmission data in a TCP session, disables information about use of TCP segment connected transmission processing in a TCP session at which loss occurs, and, after stopping the slow start phase and changing into a congestion recovery phase, continues the connected transmission processing by reporting a request for enabling the use information to connection management section 103. By this means, even when network congestion due to packet loss is detected, after a repair process of a packet loss in a session is finished, it is possible to enable the connected transmission function for a plurality of segments, making it possible to suppress an increase in the CPU load for processing packet loss due to changes in network conditions, and perform efficient TCP communication. Now, a characteristic operation and effects according to the present embodiment will be described below.

Figure 9:
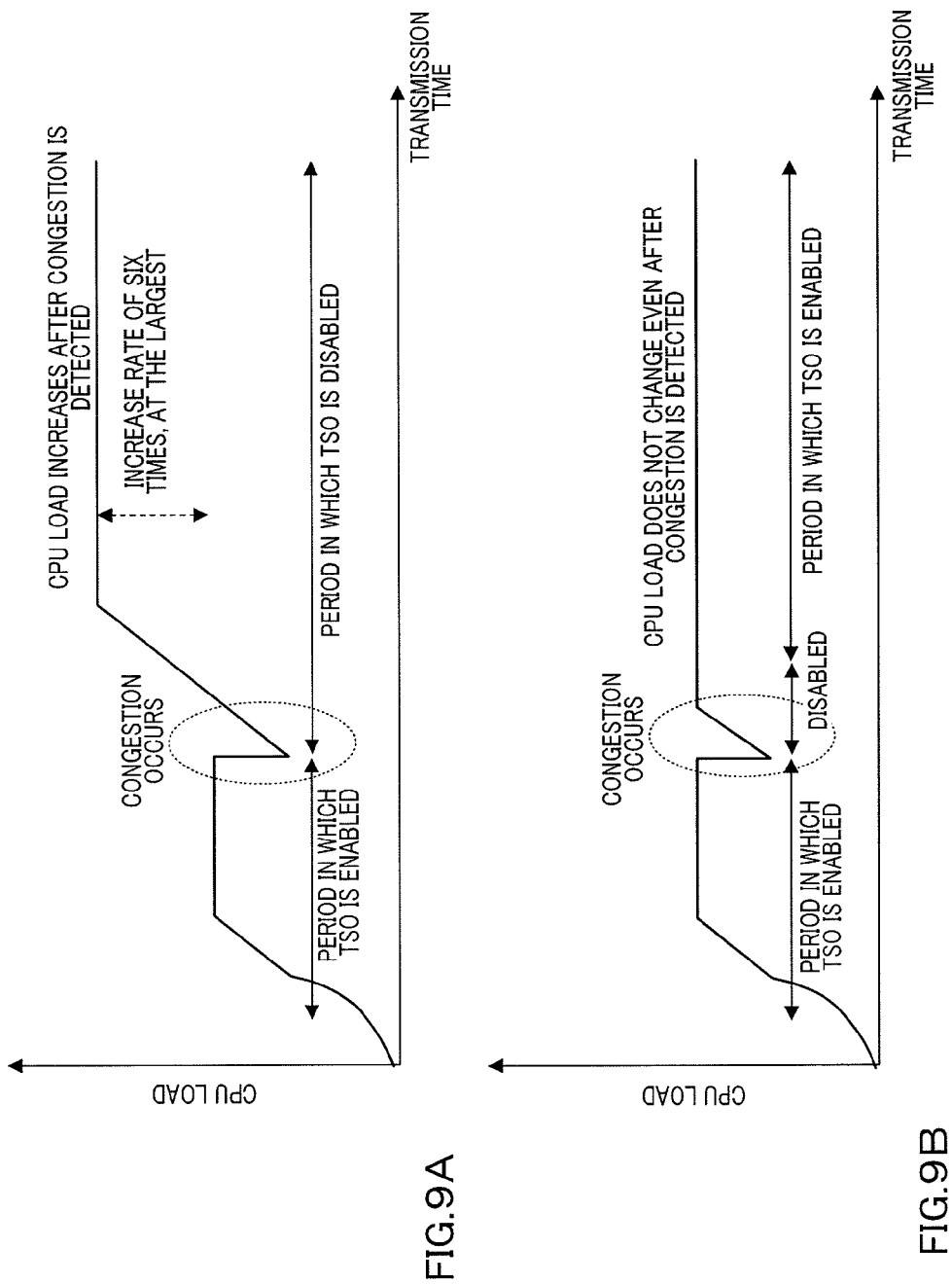
FIG. 9A explains TCP transmission control in the TCP transmission control apparatus according to above Embodiment 2.
FIG. 9B explains TCP transmission control in the TCP transmission control apparatus according to above Embodiment 2.

FIGS. 9A and 9B explain TCP transmission control. FIG. 9A shows a conventional example for comparison, and FIG. 9B shows the present embodiment.

Both the conventional example in FIG. 9A and the present embodiment in FIG. 9B shows that transmission is performed in a moderately linear manner and reaches to the stable communication status after the slow start phase is finished. The period of stable communication status until congestion occurs is a period in which TSO is enabled. With the conventional example in FIG. 9A, when congestion occurs, the size that can be transmitted is reduced and a period in which TSO is disabled is immediately set, therefore increasing the CPU load linearly. With the conventional example, after congestion is detected, the CPU load increases to approximately 6 times, at the largest. With the conventional example, when congestion is detected, the data segment connected transmission function is disabled until the session is finished, lowering the communication performance. Here, performance is deteriorated when TSO is always enabled.

By contrast, with the present embodiment, as shown in FIG. 9B, when congestion is detected, data segment connected transmission flag is disabled, and a slow start phase is finished and transitioned into a congestion avoidance phase, then, data segment connected transmission flag is enabled, and transmission is resumed. That is, because only the data segment connected transmission flag is disabled when congestion is detected, a period in which TSO is enabled continues, even when congestion occurs. Accordingly, the CPU load will not be changed even after congestion is detected.

As described above, while, with the conventional example, when network congestion due to packet loss is detected, the connected transmission function for a plurality of segments is disabled until the session is finished, with the present embodiment, it is possible to recover the connected transmission function for a plurality of segments, even after packet loss occurs. By this means, because software will not perform protocol processing per TCP segment under the control of OS, it is possible to reduce the CPU processing load and maintain transmission performance. With the present embodiment, it is possible to expect the most efficient recovery processing and maintenance of a transfer rate.

(Embodiment 3)

Next, a flow of processes at communication terminal 100, when an application using an intermittent transmission method is used, will be described with Embodiment 3.

Examples of an application using an intermittent transmission method include streaming using hyper text transfer protocol (HTTP). Usually, communication terminal 100 repeats an operation in which a certain amount of data is transmitted in every predetermined period on the order of several hundred milliseconds, and after the data is transmitted with the data size, transmission is stopped until the next period. With this kind of service, control information in TCP protocol is recalculated when data transfer is started in a certain period and when data transfer is started in the next period, so that different values are used. An example of the recalculation of TCP transmission control information 200 (see FIG. 3) includes a case where a transmitting TCP stack gradually increases a congestion window size, for example, during sequential data transfer, as long as packet loss does not occur. On the other hand, during the non-transmission period after data transfer is finished, a congestion window validation (CWV) processing is performed in which the transmitting TCP stack gradually decreases a congestion window size. The function of the CWV processing is performed when there is no data transmission request (data writing from an application) beyond the retransmission timeout period. Therefore, a problem is expected to arise that a congestion window size is possibly too small at a timing of starting transmission in each period, making it impossible to obtain the expected throughput.

Figure 10:
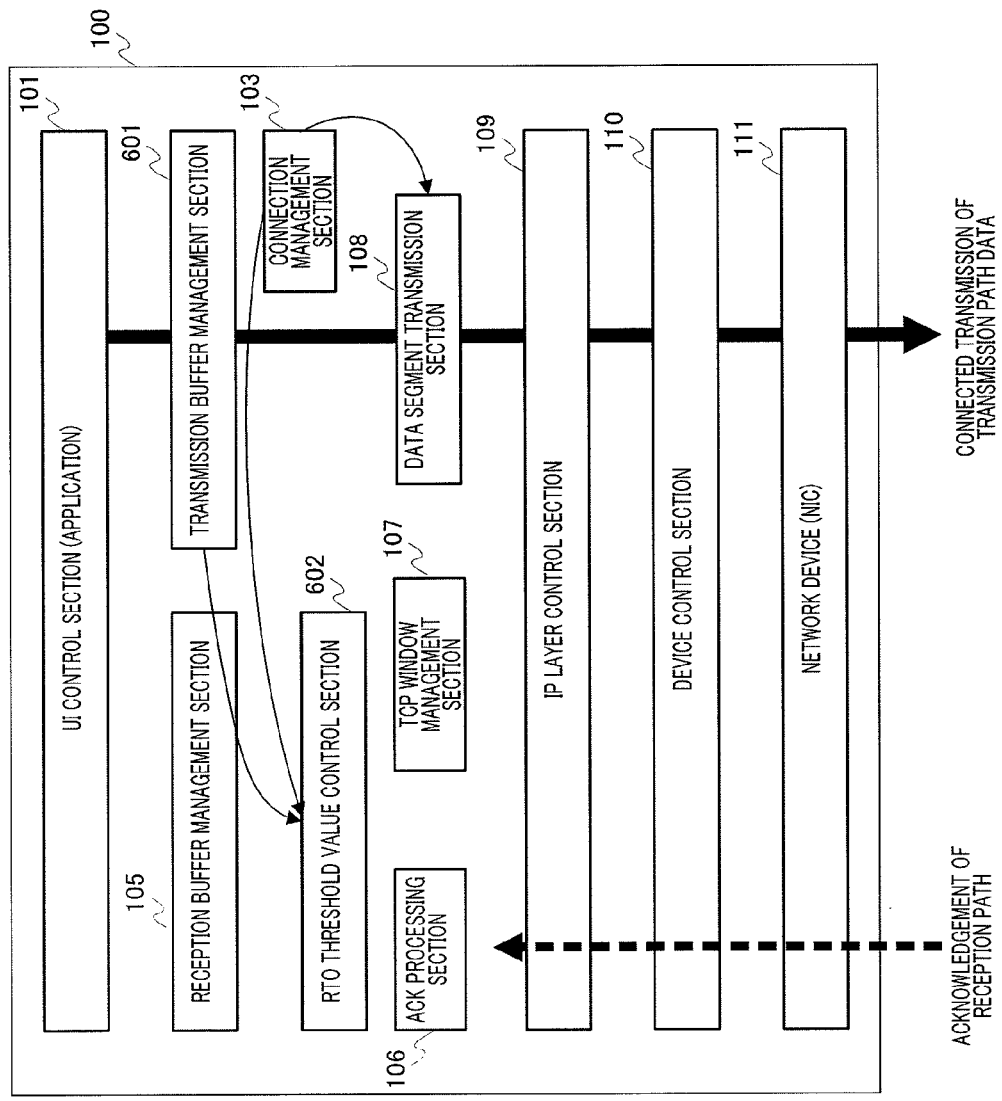
FIG. 10 is a block diagram showing a configuration of a communication terminal using the TCP transmission control apparatus according to Embodiment 3.

FIG. 10 is a block diagram showing a configuration of a communication terminal using the TCP transmission control apparatus according to Embodiment 3 of the present invention. Elements that are the same as in FIG. 2 will be assigned the same reference numerals as in FIG. 2.

As shown in FIG. 10, transmission buffer monitoring section 601 monitors the interval of writing transmission data by an application, and when the monitored writing interval is equal to the current retransmission timeout period, reports a request for increasing a RTO value to RTO threshold value control section 602. Sessions to monitor correspond to all sessions to be monitored by connection management section 103. Transmission buffer monitoring section 601 reports session descriptor 202 when the above session is open (start of an application).

RTO threshold value control section 602 changes the time to be defined for the retransmission timeout period (RTO) after the terminal 100 transmits packets. In a general TCP stack, a minimum value is provided for the retransmission timeout period, and the value of 200 milliseconds or greater is used as an initial value. RTO threshold value control section 602 increases the time when receiving a change request from transmission buffer monitoring section 601, and adjusts the retransmission timeout period such that the retransmission timeout period is always set longer than the writing interval. Other block functions are the same as in FIG. 2.

Next, an operation of communication terminal 100 will be described here using the sequence in FIG. 11 where communication terminal 100 suppresses the reduction of a congestion window size, and continues communication by maintaining the maximum number of connections of the TSO function, in the case of communication by an application using an intermittent transmission method.

Figure 11:
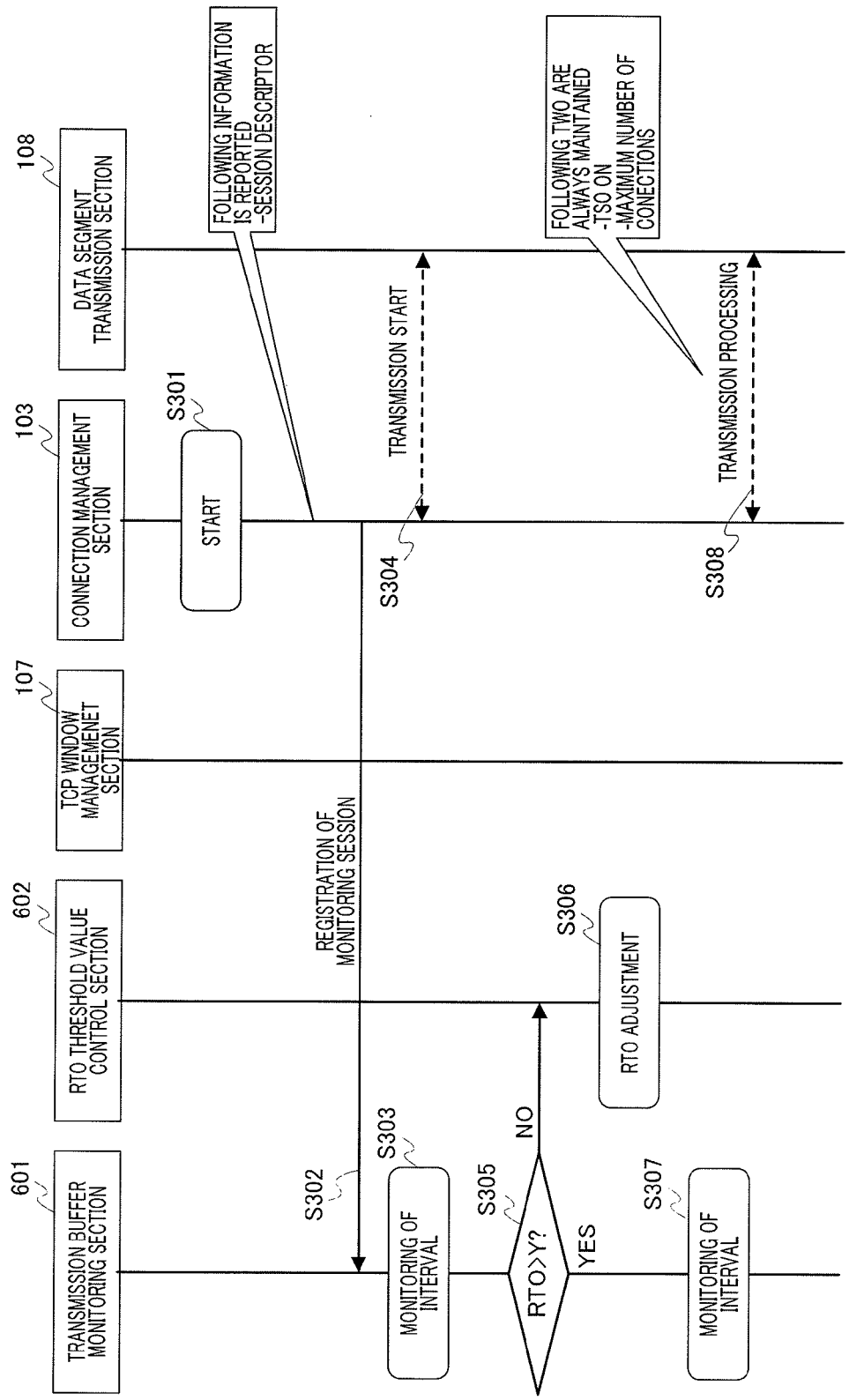
FIG. 11 shows a control sequence of congestion window size suppression, maintenance of the maximum number of connections of TSO function, and continuation of communication in the TCP transmission control apparatus according to above Embodiment 3.

FIG. 11 shows a control sequence of suppression of a congestion window size, maintenance of the maximum number of connections of the TSO function, and continuation of communication.

As shown in FIG. 11, when data transmission by an application using intermittent transmission such as streaming using HTTP is started, connection management section 103 grants new management number 201 to that open session of the application as TCP transmission control information 200 (see FIG. 3) Then, connection management section 103 manages a socket ID of the reported session using session descriptor 202, stores the received content of TSO setting information in the database of TCP transmission control information 200 (see S301).

After that, connection management section 103 reports session descriptor 202 (see FIG. 3) corresponding to the newly-registered management number 201 (see FIG. 3), to transmission buffer monitoring section 601 (see S302).

Transmission buffer monitoring section 601 starts monitoring the interval of writing the reported data (see S303). At the same time, data segment transmission section 108 starts data transmission by the application (see S204).

Transmission buffer monitoring section 601 monitors whether or not writing interval Y for transmission fails a RTO threshold value (RTO>Y is true) (see S305). Transmission buffer monitoring section 601 reports the current writing interval to and issues a request for increasing a RTO value to RTO threshold value control section 602, when the monitored writing interval is equal to (or greater than) the current retransmission timeout period ("No" in S305). After receiving the request for increasing a RTO value, RTO threshold value control section 602 adjusts the RTO value such that the RTO value is greater than the writing interval (see S306).

Transmission buffer monitoring section 601 always monitors the current retransmission timeout period and a writing interval, and performs an operation of step S307 when the retransmission timeout period is greater than writing interval Y for transmission ("Yes" in S305).

Because RTO threshold value control section 602 adjusts the retransmission timeout period, a request for data transmission (data writing from an application) beyond the retransmission timeout period will not be issued. Accordingly, it is possible for data segment transmission section 108 to continue communication without the CWV function of TCP being operated (see S308). By this means, it is possible to suppress the state where a congestion window size is too small at the timing of starting transmission in each period.

As described above, according to Embodiment 3, communication terminal 100 is provided with connection management section 103 that manages session identifier 202 to be used in a TCP session, information about use of TCP segment connected transmission processing, and the maximum number of connections of TCP segments, per TCP session. Further, communication terminal 100 is provided with transmission buffer monitoring section 601 that monitors an interval of writing transmission data in a TCP session, and RTO threshold value control section 602 that changes a timeout period such that the retransmission timeout period is longer than the writing interval, when the interval of writing transmission data is longer than the retransmission timeout period of TCP. By this means, in the case of an application using an intermittent transmission method, it is possible to suppress a reduction of a congestion window size, making it possible to maintain the transmission performance and perform efficient TCP communication by preventing the number of connected transmissions of a plurality of segments from decreasing. Now, a characteristic operation and effects according to the present embodiment will be described below.

Figures 12A, 12B:
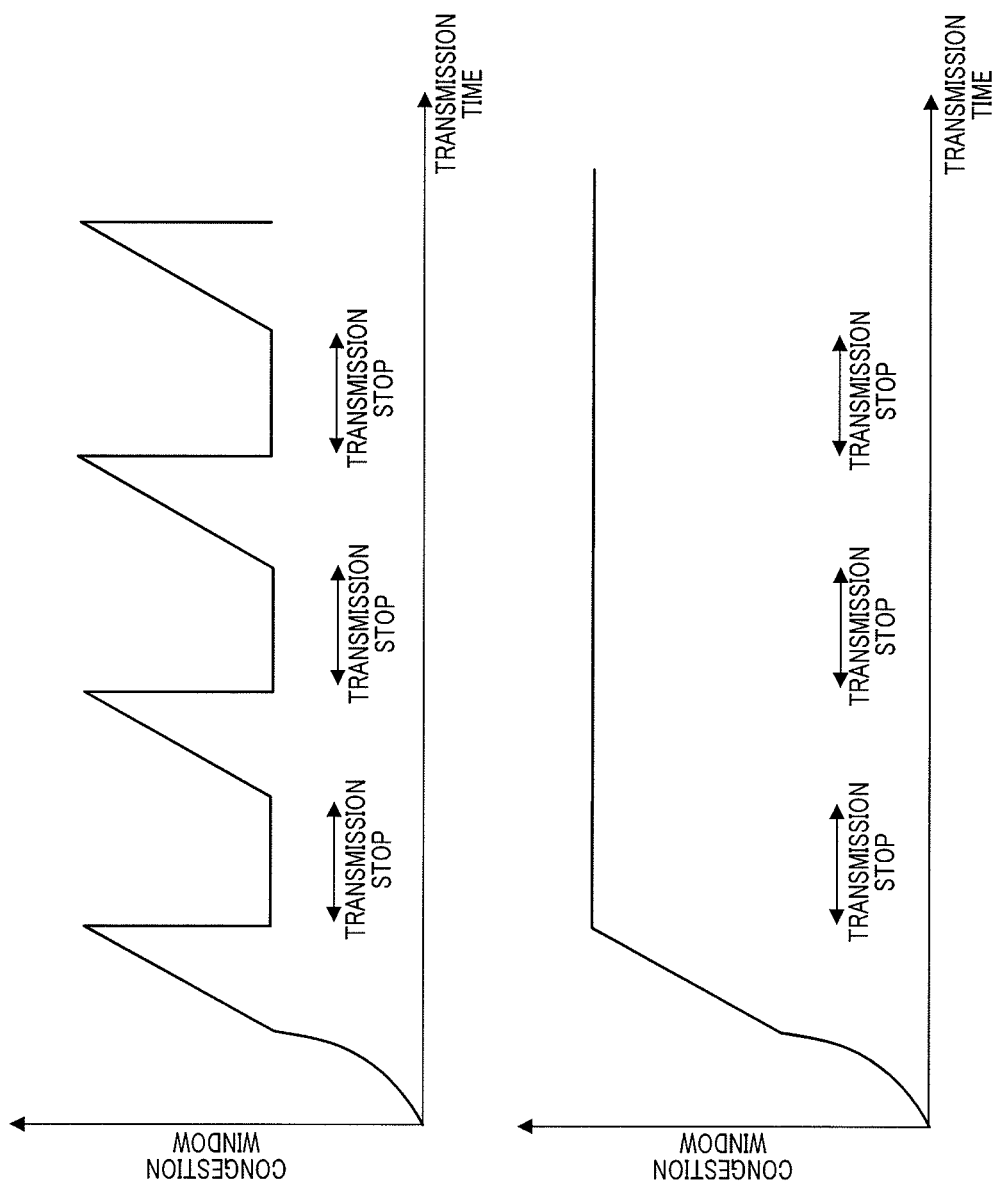
FIG. 12A explains congestion window control in the TCP transmission control apparatus according to above Embodiment 3.
FIG. 12B explains congestion window control in the TCP transmission control apparatus according to above Embodiment 3.

FIGS. 12A and 12B explain congestion window control. FIG. 12A shows a conventional example for comparison, and FIG. 12B shows the present embodiment.

Both with the conventional example in FIG. 12A and the present embodiment in FIG. 12B, transmission is performed moderately and linearly after a slow start phase is finished. As shown in FIG. 12A, with the conventional example, when congestion occurs, a congestion window moves up and down due to a function of CWV. A period in which transmission is stopped is approximately from several to ten seconds. Because a congestion window is reduced during the period in which transmission is stopped, it is not efficient.

By contrast, with the present invention, as shown in FIG. 12B, a congestion window is not made small, but is maintained being large during the period in which transmission is stopped. Specifically, transmission buffer monitoring section 601 controls a RTO threshold value (RTO>Y is true) by monitoring an interval Y of writing transmission.

RTO threshold control section 602 changes a timeout period such that retransmission timeout period is shorter than the writing interval Y for transmission.

As described above, while, with the conventional example, a connected transmission method for a plurality of TCP segments is configured such that, when starting a terminal, whether or not to use a TCP-segment connected transmission function is decided for the system as a whole, with the present invention, it is possible to decide whether or not to use the TCP-segment connected transmission function per application (session). By this means, it is possible to perform efficient TCP communication depending on device characteristics. For example, when a receiving terminal having low capability is a communicating party, it is possible to separately stop the connected transmission method for a plurality of segments. Thus, it is possible to reduce factors to cause a receiving terminal to miss receiving data, and suppress an increase in overhead due to retransmission control in TCP, which is caused by packet loss.

As a result of this, it is possible to effectively use a data segment connected transmission, and reduce the CPU load. Reduction of CPU load leas to power saving.

The above descriptions are for examples of the preferred embodiments of the present invention, and the present invention is by no means limited to these examples.

Each function block employed in communication terminal 100 may be implemented as an LSI constituted by an integrated circuit. These may be individual chips or partially or totally contained on a single chip. "LSI" is adopted here, but this may also be referred to as "IC", "system LSI", "super LSI", or "ultra LSI," depending on differing extents of integration.

Further, the method of circuit integration is by no means limited to LSI's, and implementation using dedicated circuitry or general purpose processors is also possible. After LSI manufacture, utilization of a programmable field programmable gate array (FPGA) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is possible, for example.

Although cases have been described with the present invention in detail or with specific embodiments, the present invention is by no means limited to these, and it is obvious to one skilled in the art that it is equally possible to add changes or revisions to the present invention as long as the essence of the present invention is maintained.

Although, with the present embodiment, the term "communication terminal" is used, it is merely for convenient for explanation, and it is possible to use terms such as "transmission apparatus," "TCP transmission control apparatus," and "communication system" for the name of the apparatus, and use terms such as "transmission control method" for the name of the method.

Further, regarding the parts configuring the above-described TCP transmission control apparatus, such as the kind, the number, or the connection method of network devices (NIC), any parts can be used.

Further, the above-described TCP transmission control method can also be realized by a program for making the TCP transmission control method function. This program is stored in a computer-readable recoding medium.

The disclosure of Japanese Patent Application No. 2008-331459, filed on Dec. 25, 2008, including the specification, drawings and abstract, is incorporated herein by reference in its entirety.

INDUSTRIAL APPLICABILITY

A TCP transmission control apparatus and a TCP transmission control method according to the present invention are useful, for example, for electric appliances having an effect to realize the TCP transmission processing with improved efficiency, and having a TCP/IP communication function, when high-speed communication using TCP or a streaming service, for example, is performed in a packet network including a home network or the Internet. Further, a TCP transmission control apparatus and TCP transmission control method according to the present invention are also applicable to the use of, for example, a vehicle-mounted communication device that is connected to the vehicle LAN and performs TCP/IP communication, or a mobile phone having a communication interface for home networking.

REFERENCE SIGNS LIST

100 Communication terminal
101 UI control section
102 TSO control section
103 Connection management section
104 Transmission buffer management section
105 Reception buffer management section
106 ACK processing section
107 TCP window management section
108 Data segment transmission section
109 IP layer control section
110 Device control section
111 Network device
401 Congested state monitoring section
601 Transmission buffer monitoring section
602 RTO threshold value control section

The invention claimed is:

1. A transport control protocol transmission control apparatus for performing transport control protocol/Internet protocol data transmission by hardware processing and software processing, the apparatus comprising:
 a transport control protocol segmentation offload controller that determines whether to use connected transmission processing for a transmission control protocol segment in a transport control protocol session that is open for data transmission;
 a connection manager that manages a session identifier to be used in the transport control protocol session, information of use of the connected transmission processing and a maximum number of connections that are reported from the transport control protocol segmentation offload controller, and sets a transport control protocol segmentation offload operation on or off, per transport control protocol session, separately, and enables and stops a transport control protocol segmentation offload function, respectively;
 a buffer monitor that monitors an interval of writing transmission data in the transport control protocol session; and
 a retransmission timeout threshold value controller that controls a retransmission timeout period of the transport control protocol,
 wherein the maximum number of connections is a maximum number of transport control protocol segments to connect at a time in the connected transmission processing,
 the connection manager is configured to change an on or off setting of the transport control protocol segmentation offload operation during data transmission, per transport control protocol session, separately,
 the connection manager suppresses reduction of a congestion window size value based on the managed maximum number of connections, and
 when the interval of writing transmission data is longer than the retransmission timeout period of the transport control protocol in a session using an intermittent transmission method, the retransmission timeout threshold value controller changes the retransmission timeout period so that the retransmission timeout period is longer than the interval of writing transmission data to suppress the reduction of the congestion window size for maintaining the maximum number of connections of the transport control protocol segment and continuing the connected transmission processing.

2. The transport control protocol transmission control apparatus according to claim 1, further comprising:
 a congested state monitor that monitors loss of a transmission data packet in the transport control protocol session, disables information about use of transport control protocol segment connected transmission processing for a transport control protocol session in which a loss occurs, and, after finishing a transport control protocol slow start phase and transitioning into a congestion recovery phase, continues the connected transmission processing by reporting a request for enabling the information about use of transport control protocol segment connected transmission processing, to the connection manager.

3. The transmission control protocol transmission control apparatus according to claim 1,
 wherein the connection manager decides to turn the transport control protocol segmentation offload operation on and off depending on changes of the congestion window size.

4. A transmission control protocol transmission control method for performing data transmission of transport control protocol by hardware processing and software processing, the method comprising:
 determining whether to use connected transmission processing for a transport control protocol segment in a transport control protocol session that is open for data transmission; and
 managing a session identifier to be used in the transport control protocol session, information of use of the connected transmission processing and a maximum number of connections that are reported from a transport control protocol segmentation offload controller, and setting a transport control protocol segmentation offload operation on or off, separately, and enabling and stopping a transport control protocol segmentation offload function per transport control protocol session, respectively;
 monitoring an interval of writing transmission data in the transport control protocol session; and controlling a retransmission timeout period of the transport control protocol, wherein the maximum number of connections is a maximum number of transport control protocol segments to connect at a time in the connected transmission processing, on/off setting of the transport control protocol segmentation offload operation is configured to be changed during data transmission by the managing, per transport control protocol session, separately, the managing suppresses reduction of a congestion window size value based on the managed maximum number connections, and when the interval of writing transmission data is longer than the retransmission timeout period of the transport control protocol in a session using an intermittent transmission method the controlling changes the retransmission timeout period so that the retransmission timeout period is longer than the interval of writing transmission data to suppress the reduction of the congestion window size for maintaining the maximum number of connections of the transport control protocol segment and continuing the connected transmission processing.

5. The transport control protocol transmission control method according to claim 4, further comprising:

monitoring loss of a transmission data packet in the transport control protocol session; and disabling information about use of transport control protocol segment connected transmission processing in a transport control protocol session at which loss occurs, and, after finishing a transport control protocol slow start phase and transitioning into a congestion recovery phase, continuing the connected transmission processing by reporting a request for enabling the information about use of transport control protocol segment connected transmission processing.

6. The transport control protocol transmission control method according to claim 4, wherein the managing decides whether to set the transport control protocol segmentation offload operation on/off depending on changes in the congestion window size.

* * * * *